US012036580B2

(12) United States Patent
Gunn

(10) Patent No.: US 12,036,580 B2
(45) Date of Patent: Jul. 16, 2024

(54) SOIL SEDIMENT AND PAY DIRT SEPARATION DEVICE

(71) Applicant: Tyler Charles Gunn, Meridian, ID (US)

(72) Inventor: Tyler Charles Gunn, Meridian, ID (US)

( * ) Notice: Subject to any disclaimer, the term of this patent is extended or adjusted under 35 U.S.C. 154(b) by 0 days.

(21) Appl. No.: 17/815,159

(22) Filed: Jul. 26, 2022

(65) Prior Publication Data

US 2023/0330706 A1 Oct. 19, 2023

Related U.S. Application Data

(60) Provisional application No. 63/332,239, filed on Apr. 18, 2022.

(51) Int. Cl.
*B07B 1/24* (2006.01)
*B07B 1/02* (2006.01)

(52) U.S. Cl.
CPC . *B07B 1/24* (2013.01); *B07B 1/02* (2013.01)

(58) Field of Classification Search
CPC .... B07B 1/02; B07B 1/24; B03B 5/58; B03B 5/56
See application file for complete search history.

(56) References Cited

U.S. PATENT DOCUMENTS 5,423,430 A * 6/1995 Zaffiro .................. B07B 1/4672 209/403
7,114,459 B2 * 10/2006 Schmidt ............... A01K 1/0114 119/161
8,113,355 B1 * 2/2012 Peterson ................... B03B 5/02 241/24.1
8,123,045 B2 * 2/2012 White ................... B07B 1/4681 99/323.5
8,646,614 B2 * 2/2014 Peterson ................... B03B 5/02 209/233
10,010,910 B1 * 7/2018 Stover ....................... B07B 1/02
2013/0213862 A1 * 8/2013 Peterson ................... B07B 1/00 209/235
2016/0108555 A1 * 4/2016 Rosado ..................... B07B 1/06 209/409

FOREIGN PATENT DOCUMENTS

CN 110813685 A * 2/2020

OTHER PUBLICATIONS

Machine translation of CN-110813685 (Year: 2020).*

* cited by examiner

*Primary Examiner* — Patrick H Mackey
(74) *Attorney, Agent, or Firm* — Shaver Swanson; Scott D. Swanson

(57) ABSTRACT

An improved separation device having a frustoconical funnel and collection chamber. The collection chamber is removably attached to the frustoconical funnel. Preferably, the frustoconical funnel has a tapered section and a wide-mouthed section. The wide-mouthed section extends below the mouth of the funnel to a tapering point. The inner surface of the frustoconical funnel utilizes a combination of bars and posts extending from the inner surface of the funnel section. The posts can be a variety of sizes, shapes, and numbers. The bars can extend across the diameter of the filter section or alternatively to form one or more chords of the filter section. Preferably the collection chamber has a clear wall and/or floor to allow a user to view material within the collection chamber.

11 Claims, 7 Drawing Sheets

SOIL SEDIMENT AND PAY DIRT SEPARATION DEVICE

CROSS REFERENCE TO RELATED APPLICATIONS

This application claims the benefit of U.S. Provisional Application No. 63/332,239, filed Apr. 18, 2022, the disclosure of which is incorporated by reference.

FIELD OF THE INVENTION

The presently disclosed technology relates to separators for use in separating pay dirt from heavy metals. More particularly, the present invention is a handheld separator used to agitate pay dirt to cause the pay dirt to fall out of suspension.

BACKGROUND OF INVENTION

Pay dirt is typically considered dirt that is thought to have heavy metals, such as gold, silver, or other valuable heavy metal, in the dirt. There are many different devices known to separate and isolate the heavy metal from the dirt, such as sluice boxes and shaker tables. However, there is not a handheld, portable device useful for separating pay dirt from gold, or a hand held device that allows a user to visually inspect for the presence of gold without having to remove the pay dirt from the device.

SUMMARY

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a handheld separation device. The handheld separation device having a frustoconical funnel removably attached to a collection chamber. The frustoconical funnel having a wide opening at a top of the funnel for placement therein of soil sediment, also called pay dirt. The frustoconical funnel having a tapered body extending beneath the mouth and progressively constricting to a narrow opening at a bottom of the frustoconical funnel. The frustoconical funnel defining a sediment suspension chamber for receiving the soil sediment.

The collection chamber is removably attached either directly or indirectly to the frustoconical funnel at the narrow opening of the frustoconical funnel at the of the funnel. The collection chamber preferably comprising a clear wall and/or floor for a user to view material within the collection chamber. A plurality of agitation structures is positioned within the frustoconical funnel and extends from the inner surface of the frustoconical funnel into the sediment suspension chamber. The frustoconical funnel is configured such that a user can grasp opposing sides of the funnel and rotate the funnel back and forth to agitate the material in the funnel. The agitation structures serve to provide further agitation to the soil sediment, causing gold or other heavy metal to fall under force of gravity into the collection chamber.

The agitation structures can be provided in a variety of forms. For example, one or more rods extending across the sediment suspension chamber can be provided. This rod can extend across a diameter of the frustoconical funnel, either at the top of the funnel, the bottom, or somewhere in between. This can be at the wide opening or the narrow opening of the funnel. Alternatively the rods can form chords across the frustoconical funnel. In addition to or alternative to the one or more rods, the agitation structures can utilize a series of posts extending from the inner surface of the frustoconical funnel. These posts can be at opposing positions on the inner surface of the frustoconical funnel.

Further disclosed is a method of using a separation device. In the method, the user will hold the device close to their chest and begin to twist/rotate the device in a 90 degree back and forth twist motion and will continue to vigorously and aggressively keep twisting in that 90 degree back and forth motion. The internally mounted agitation bars and agitation nubs are mounted directly to the container/suspension chamber frame so when the container frame rotates the agitation bars and agitation numbs will rotate with it.

The dirt which is placed directly into the container will be vigorously agitated due to the contact that is being made with the agitation bars and agitation nubs which will cause the dirt to become suspended due to its vibrations created by the force of "internal contact agitation". During this suspension period, the dirt will be suspended based on its material weight due to its gravitational pull.

As the user is continuously twisting the device in a back-and-forth motion, the agitation bars and agitation nubs are making contact with the dirt contained within the device which causes suspension and separation to take place. After 30 seconds of manual agitation by the user, all the dirt will be separated and settled based on its material weight. All the heaviest materials will be deposited at the very bottom of the removable cup. Preferably the removable cup has at least one clear wall and a clear floor.

The user will then visually inspect the bottom of the removable chamber to locate any presence of gold. If there is gold at the bottom of the removable chamber, then the user will simply remove the detachable cup and empty its contents which contain gold. Once the removable chamber is detached then the user can empty the remaining waist dirt which is left inside the container/suspension chamber by turning the container to its side for emptying. After the removable chamber has been emptied then the user will reattach the removable chamber back to the bottom of the container/suspension chamber and repeat the process.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE DRAWINGS

Figure 1:
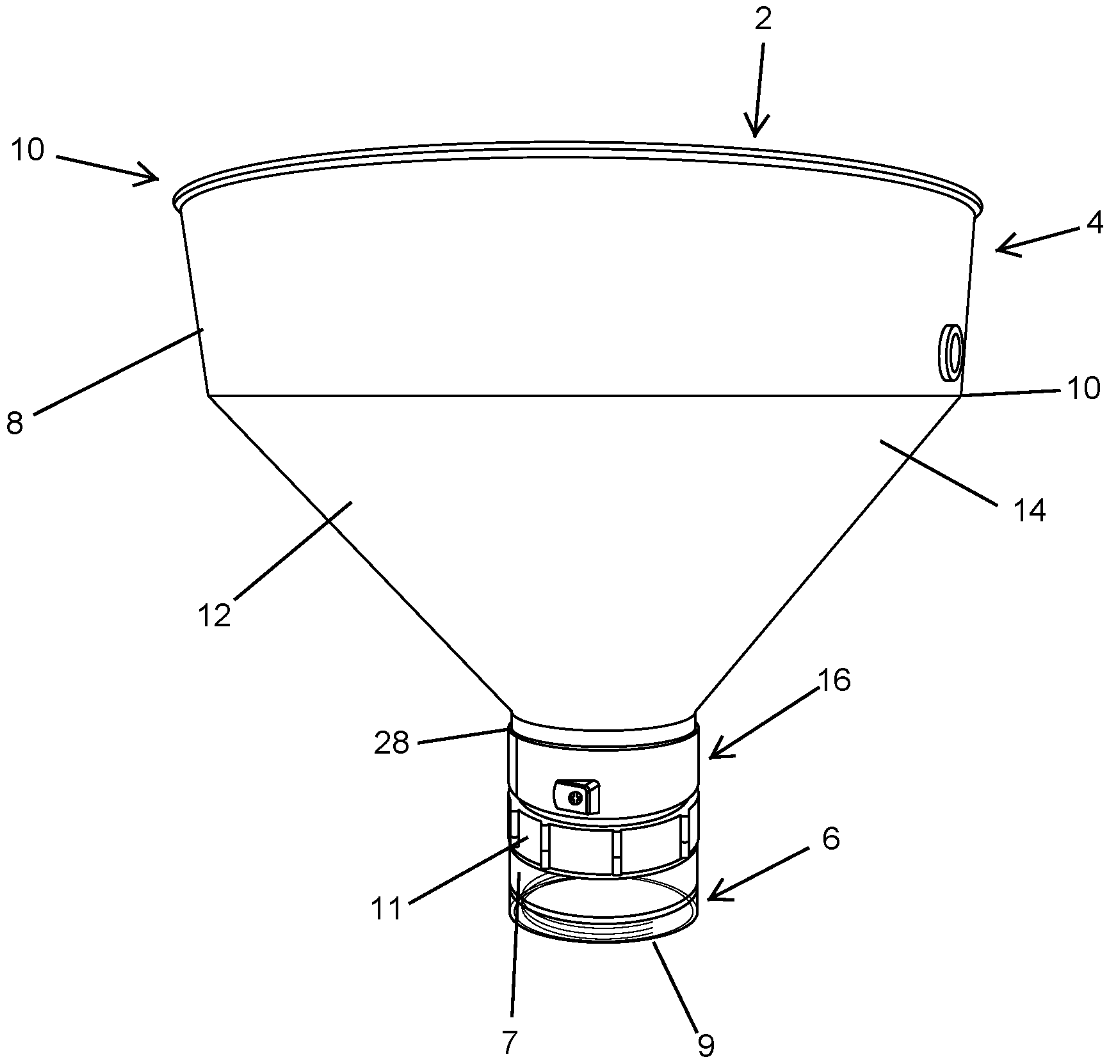
FIG. 1 is an embodiment of an improved separation device.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a preferred embodiment of an improved separation device. The improved separation device 2 has a frustoconical funnel 4 and a collection chamber 6. The collection chamber preferably utilizes a clear material, such as glass or a plastic, on the side(s) and/or bottom of the collection chamber to allow the user to visually inspect the collection chamber without removing the collection chamber from the frustoconical funnel and without having to empty the pay dirt from the frustoconical funnel. In the depicted embodiment the collection chamber is cylindrical, although alternate geometric shapes can be utilized.

The frustoconical filter in the depicted embodiment has a wide-open mouth 10 and upper section 8. Material such as pay dirt is placed in the device through the mouth of the funnel. The upper section transitions 10 to the frustoconical section 12 that serves to direct the heavy metal (such as gold) to the collection chamber. The frustoconical section has wide upper portion 14 that tapers to a narrow connector 16. The narrow mouth and connecter are configured for releasable connection to the collection chamber 6.

The collection chamber has at least one wall that is formed of a clear material. Preferably both the wall and the floor 9 of the collection chamber form a clear material. The collection chamber has a connector 11 that is configured for connection to the connector 16 of the narrow mouth of the frustoconical funnel.

Figure 2:
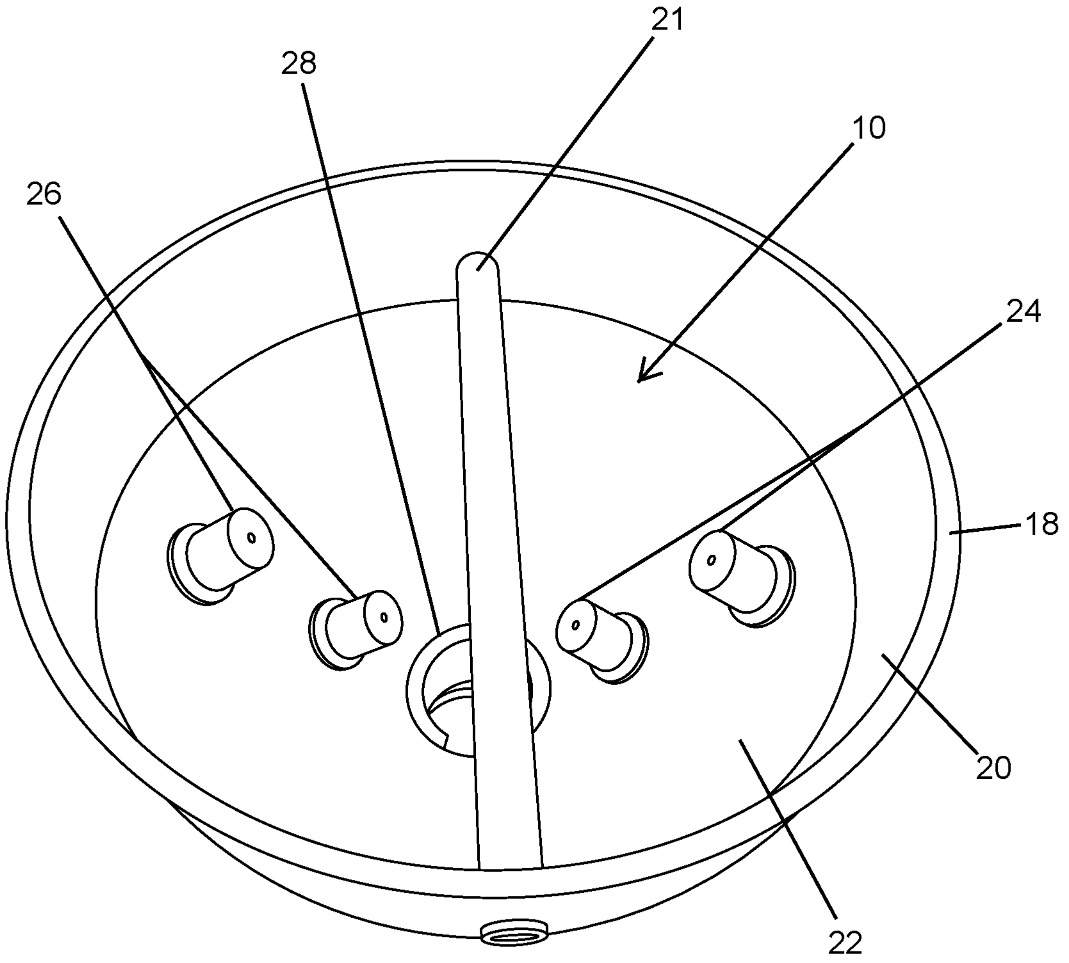
FIG. 2 is a first top view of the improved separation device of FIG. 1.

FIG. 2 is a top view looking into the wide mouth 10 of the collection device. The inner body of the funnel section utilizes a series of agitation posts and bars extending through the body of the funnel. FIG. 2 illustrates opposing posts 24, 26 positioned on the inner surface 22 of the frustoconical portion of the separation device. A bar 21 extends across the diameter of the wide mouth of the funnel.

Figure 3:
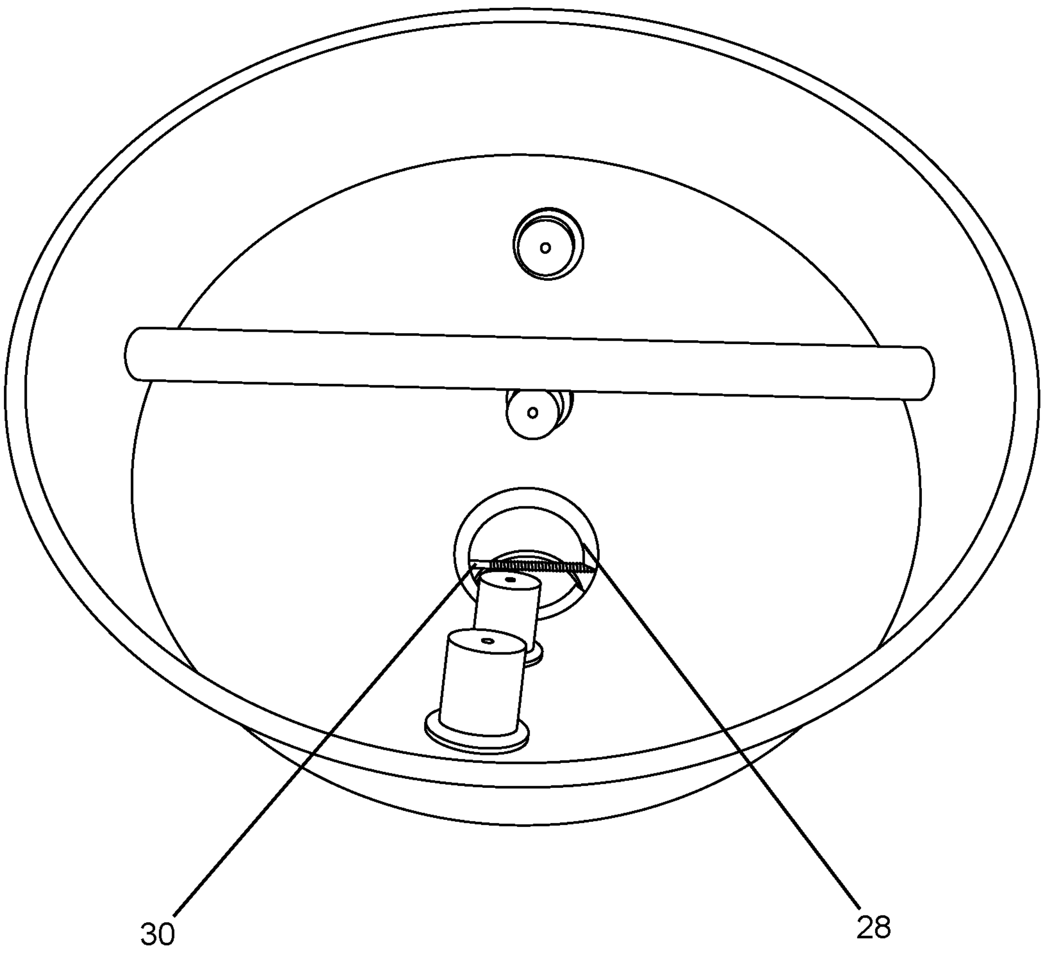
FIG. 3 is a second top view of the improved separation device of FIG. 1.

FIG. 3 illustrates the top view of FIG. 2 with the filtration device rotated ninety degrees. The ninety-degree rotation provides the view of a second bar 30 positioned across the diameter of the narrow mouth 28 of the frustoconical filter.

Figure 4:
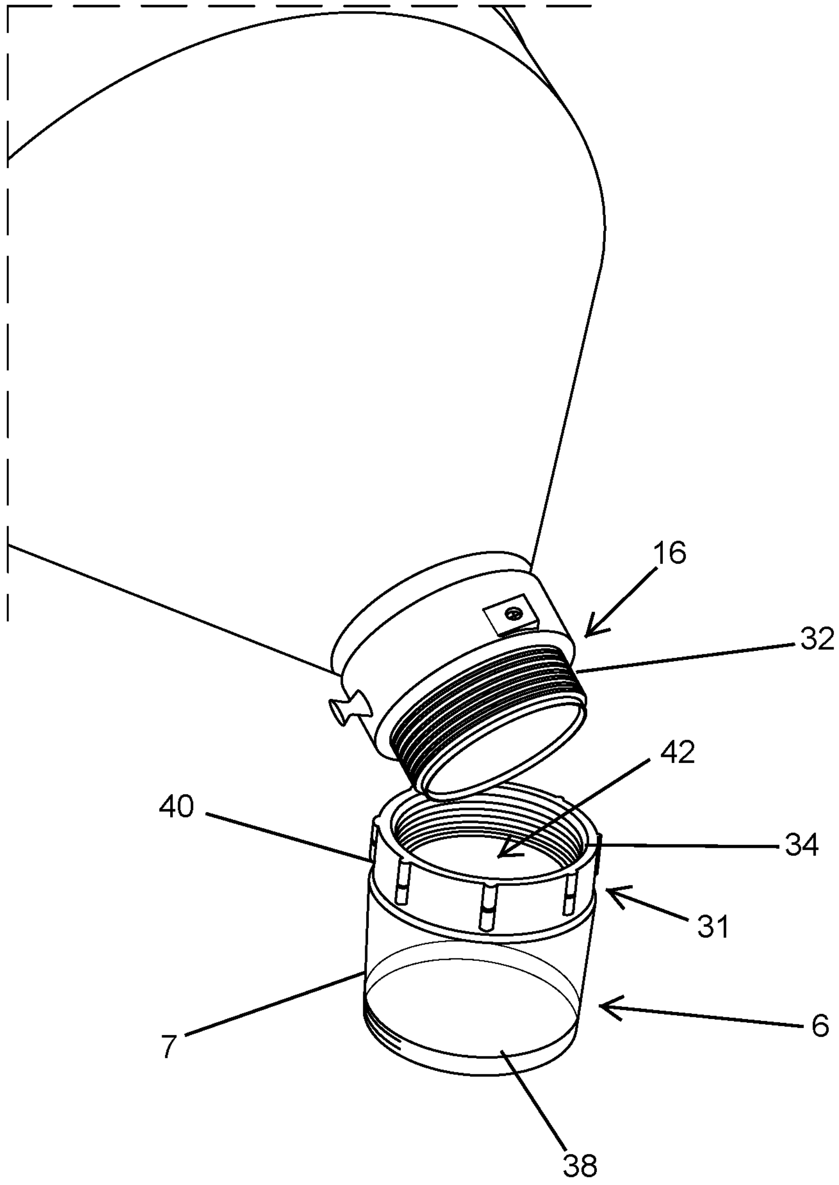
FIG. 4 is a perspective view of the improved separation device of FIGS. 1-3 showing the collection chamber decoupled from the frustoconical funnel.
Figure 5:
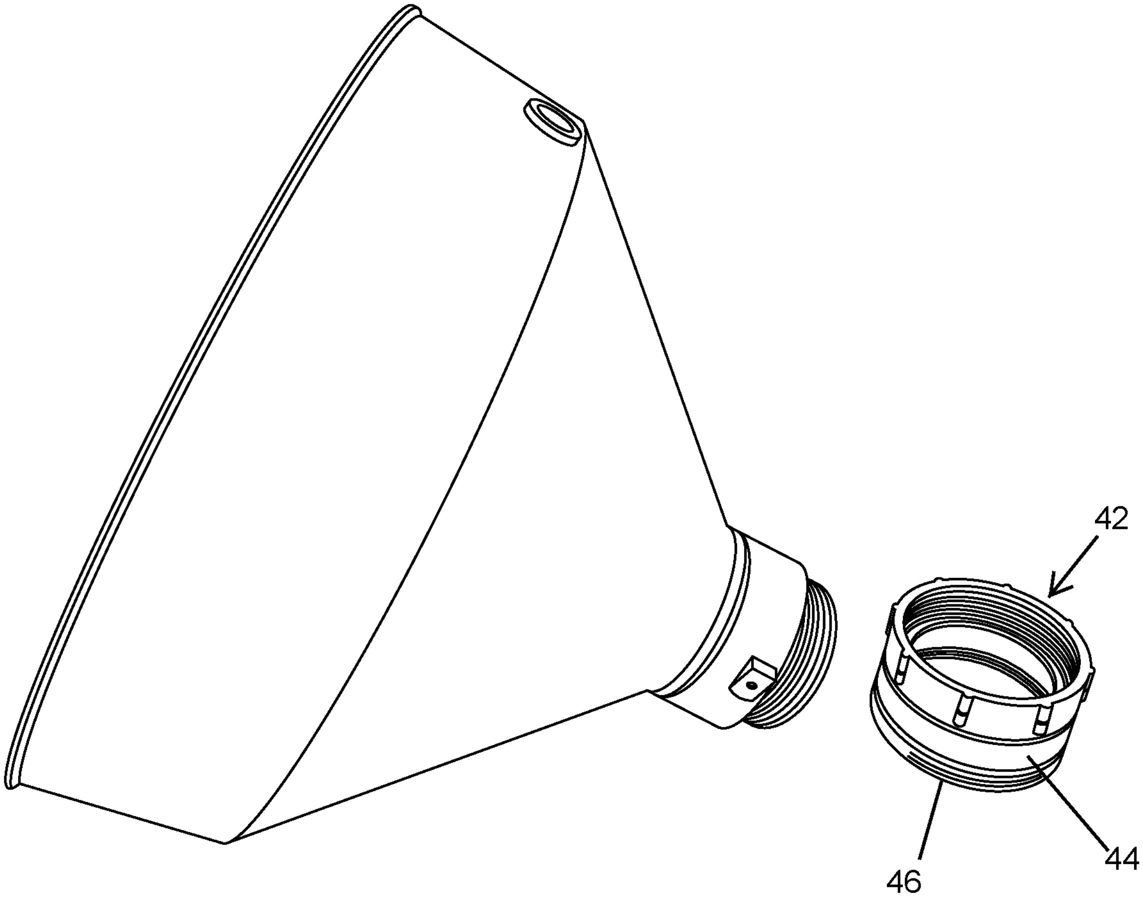
FIG. 5 is a second embodiment of an improved separation device having a smaller collection chamber.
Figure 6:
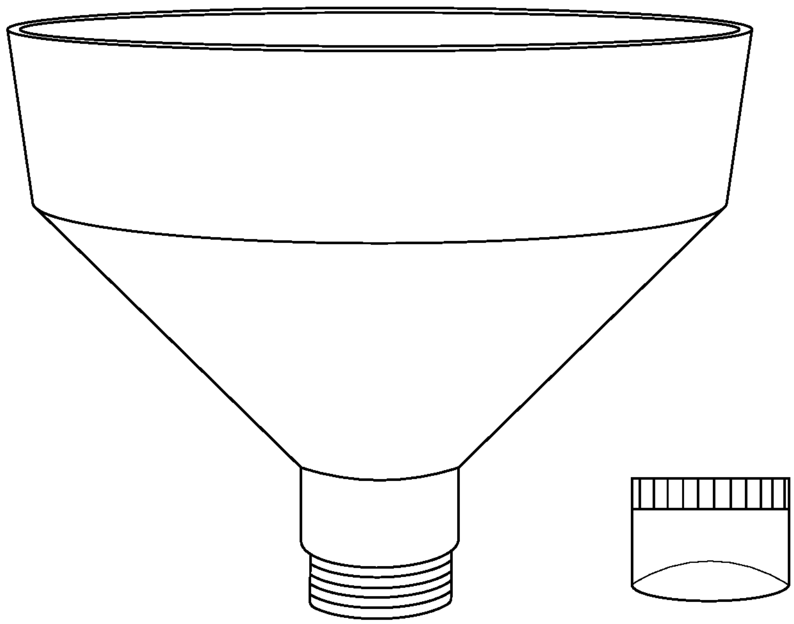
FIG. 6 illustrates the funnel section detached from an embodiment of a collection chamber.

FIG. 4 illustrates the collection chamber 6 detached from the connecter of the frustoconical cone. The depicted connecter 16 has a male threaded section 32. The collection chamber 6 has a connecter portion 31 configured for threaded engagement with the male threads 32 of the cone connector. The female threads 34 connect the collection chamber to the connector of the frustoconical cone. While a threaded connection is shown, alternate connections are envisioned, including but not limited to a clamping attachment, pressure locking snaps, or snap on. Finger grips 40 are positioned around the connector 31 to provide for ease of rotation around the chamber. In the depicted embodiment the walls 7 of the collection chamber is made of a clear material as is the floor 38. FIG. 5 illustrates a further embodiment of the separation device in which a smaller collection chamber 42 is utilized. The smaller collection chamber has a clear wall 44 and a clear floor 46 in the depicted embodiment.

Figure 7:
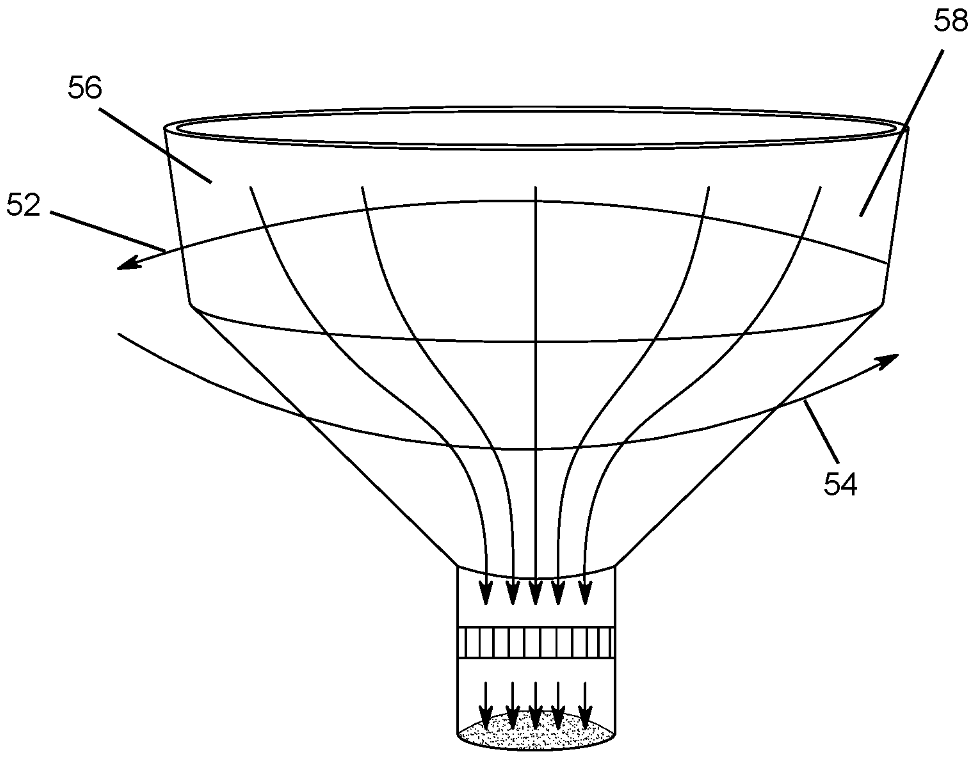
FIG. 7 illustrates the improved collection device in use.
Figure 8:
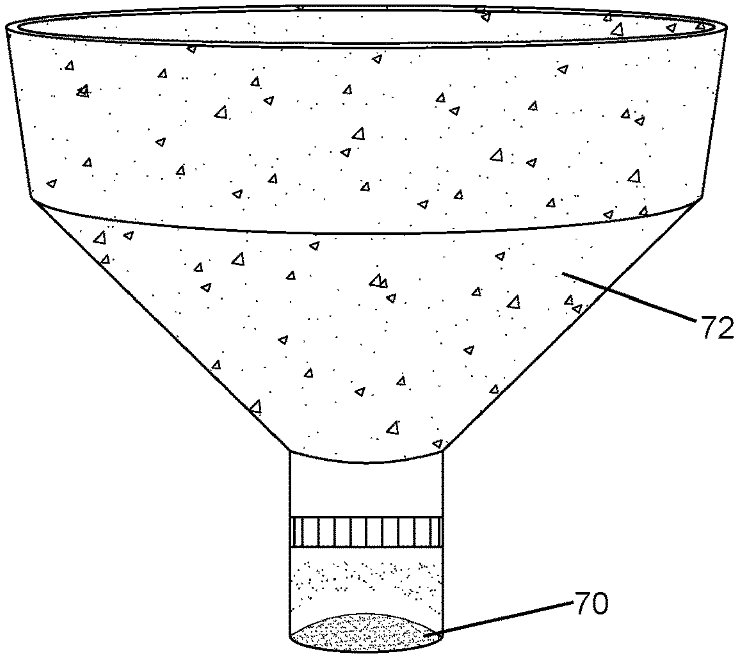
FIG. 8 illustrates the improved collection device in use showing positioning of material being separated in the improved collection device.
Figure 9:
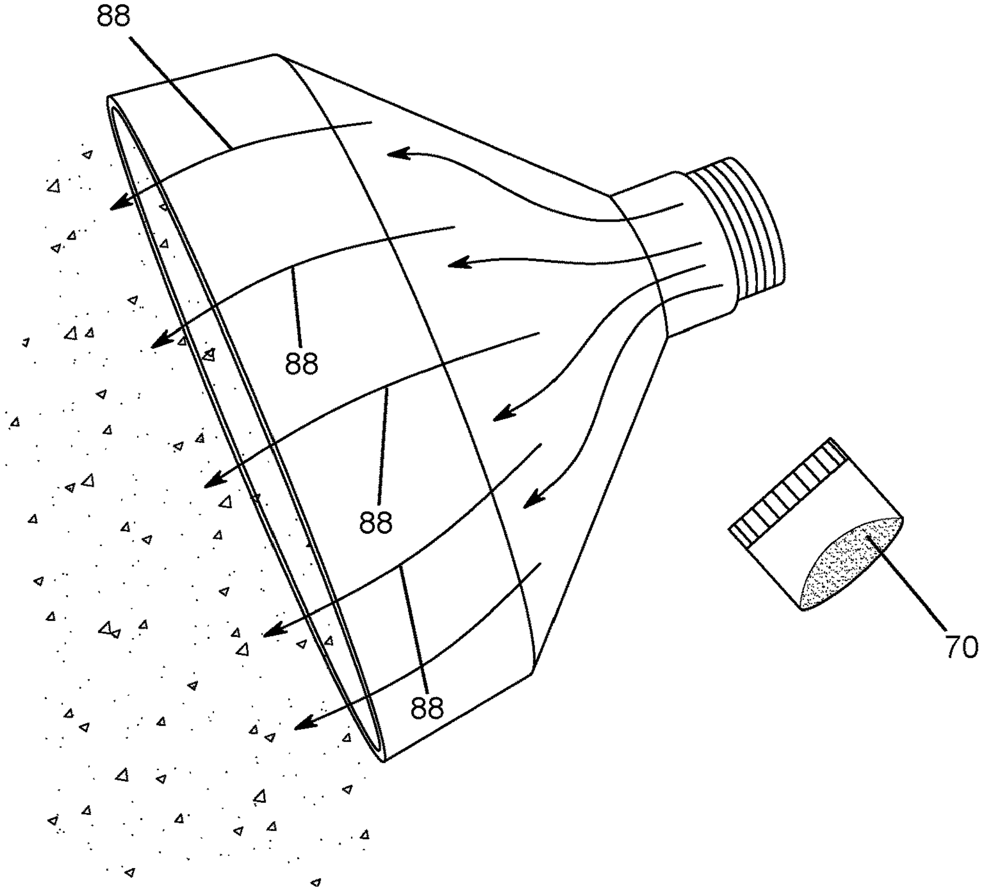
FIG. 9 illustrates the final step of utilizing the improved collection device in discarding waste material leaving heavy metal, such as gold, in the collection chamber.

FIGS. 7-9 illustrate the improved separation device in use. In use, materials such as pay dirt is positioned within the frustoconical cone. When sufficient material is positioned in the device, a user holds the device in the user's hands and rotates the device back and forth along arrows 52, 54. The user preferably positions their hands at positions 56, 58. The agitation of the separation device coupled with the internal bars and posts causes agitation of the material inside. Due to gravity, coupled with the ongoing agitation, the heavier metals sink to the bottom of the separation device along the walls of the funnel. The heavier metals sink to and settle at the bottom of the collection chamber. FIG. 8 illustrates the separation of the material in process with the waste, dirt and soil sediment being suspended 72 in the water or liquid. The heavy metal 70 has sunk to the bottom of the filtration chamber. Heavier material, such as sand, are suspended above the heavy metals at the bottom of the collection chamber. The collection chamber is made of a clear material, such that a user can monitor the collection of heavy metals, such as gold, in the collection chamber. FIG. 9 illustrates the discarding 88 of waste material leaving heavy metal, such as gold, in the collection chamber.

While in the depicted embodiment four posts are utilized, fewer or additional posts on the inner surface of the frustoconical funnel can be utilized. These posts can vary in positioning and can be positioned on the surface of the tapering frustoconical funnel section or in the wide mouth lip section. Similarly, additional bars can be utilized that extend across the diameter or alternatively, such as a chord, the funnel section.\

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A handheld separation device comprising:

a frustoconical funnel, wherein said frustoconical funnel comprising a wide opening at a top of said funnel, a tapered body progressively constricting to a narrow opening at a bottom of said funnel, wherein said frustoconical funnel defining a sediment suspension chamber;

a collection chamber removably attached to said tapered body of said funnel at said narrow opening of said frustoconical funnel at said bottom of said frustoconical funnel, said collection chamber comprising a clear wall and/or floor configured for a user to visually inspect the collection chamber without removing the collection chamber from the frustoconical funnel;

a plurality of agitation structures positioned within the tapered body and extending from an inner surface of said frustoconical funnel into said sediment suspension chamber.

2. The separation device of claim 1 wherein said agitation structures comprise at least one rod extending across said sediment suspension chamber.

3. The separation device of claim 2 wherein said at least one rod is extending across said suspension chamber at said narrow opening.

4. The separation device of claim 2 wherein said at least one rod is positioned on a diameter of said wide opening.

5. The separation device of claim 2 wherein said at least one rod is positioned across said wide opening.

6. The separation device of claim 5 wherein said at least one rod is positioned across a diameter of said wide opening.

7. The separation device of claim 1 wherein said agitation structures comprise a series of posts extending from said inner surface of said frustoconical funnel.

8. The separation device of claim 7 wherein said agitation structures are positioned on opposing sides of said inner surface of said frustoconical funnel.

9. The separation device of claim 1 wherein said collection chamber is threadingly attached to said narrow opening of said frustoconical funnel.

10. The separation device of claim 1 wherein said collection chamber is cylindrical.

11. A method of separating a heavy metal from soil, said method comprising:

the step of providing a handheld separating device, the separating device comprising a frustoconical funnel, wherein said frustoconical funnel comprising a wide opening at a top of said funnel, a tapered body progressively constricting to a narrow opening at a bottom of said funnel, wherein said frustoconical funnel defining a sediment suspension chamber;

a collection chamber removably attached to said narrow opening at said bottom of said funnel, wherein said collection chamber comprising a clear wall and/or floor for viewing material within said collection chamber;

a plurality of agitation structures positioned within the tapered body and extending from an inner surface of said frustoconical funnel into said sediment suspension chamber;

the step of placing soil sediment into the frustoconical funnel;

the step of rotating and agitating said separating device to agitate the soil sediment to cause heavy materials to fall under gravity into said collection chamber;

the step of observing material in said collection chamber through said clear wall and/or floor of said collection chamber after said step of rotating and agitating said separation device to determine if a sought after material is located in said collection chamber;

the step of discarding the soil sediment remaining in said frustoconical funnel after rotating and agitating said separating device.

* * * * *